O. Stoddard,
Mower.
No. 19958  Patented April 13, 1858
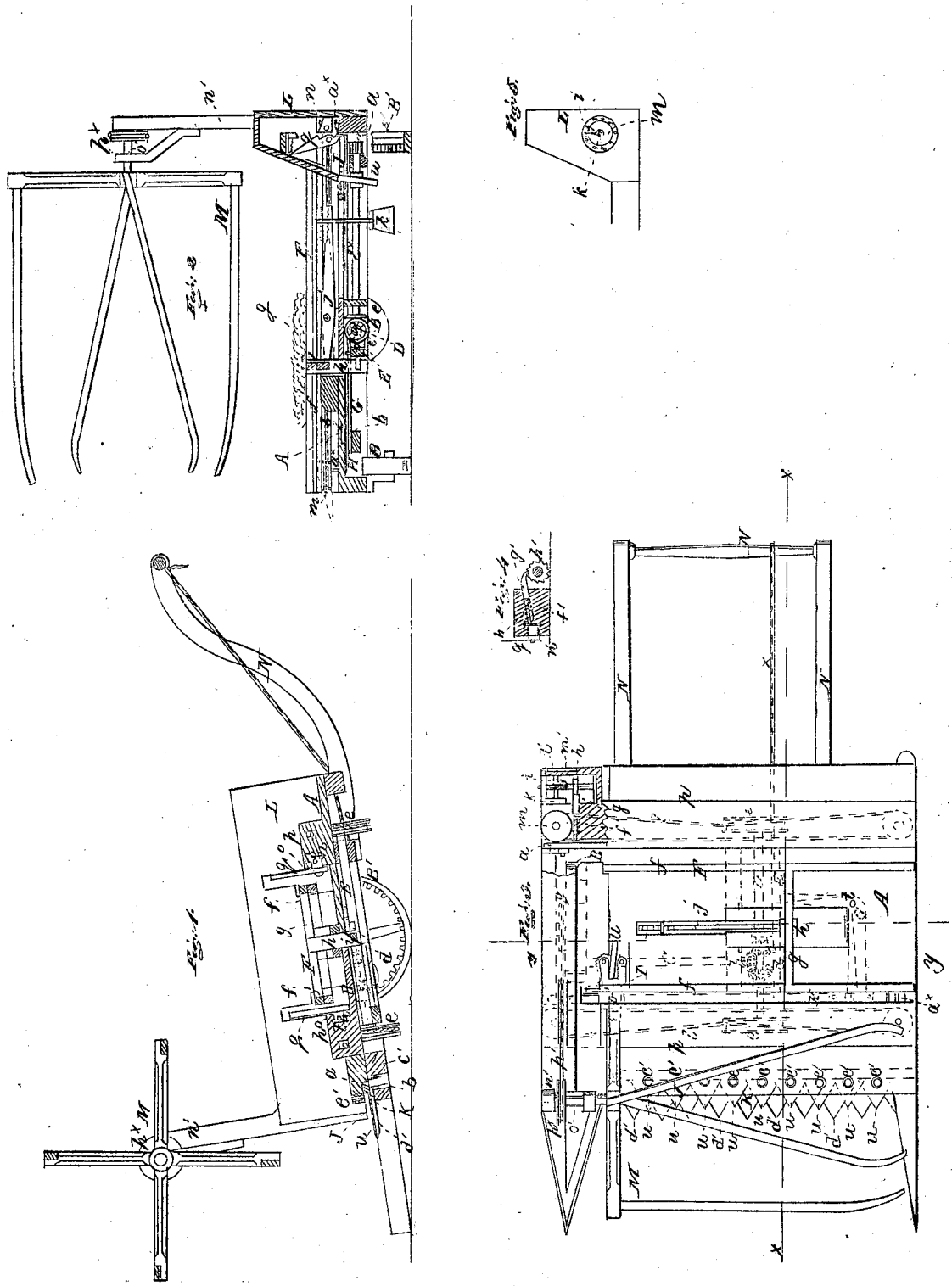

UNITED STATES PATENT OFFICE.

O. STODDARD, OF BUSTI, NEW YORK.

IMPROVEMENT IN RAKING ATTACHMENTS TO HARVESTERS.

Specification forming part of Letters Patent No. 19,958, dated April 13, 1858.

*To all whom it may concern:*

Be it known that I, OREN STODDARD, of Busti, in the county of Chautauqua and State of New York, have invented a new and Improved Harvesting-Machine; and I do hereby declare that the following is a full, clear, and exact description of the same, reference being had to the annexed drawings, making a part of this specification, in which—

Figure 1 is a side sectional elevation of my improvement, taken in the line $x\ x$, Fig. 3. Fig. 2 is a front sectional elevation of the same, taken in the line $y\ y$, Fig. 3. Fig. 3 is a plan or top view of the same, one portion being bisected in order to show the mechanism by which the registering device is operated. Fig. 4 is a detached view of a portion of the registering device. Fig. 5 is a detached face view of the dial of the same.

Similar letters of reference indicate corresponding parts in the several figures.

This invention consists, first, in a novel raking device so constructed and arranged that the cut grain, in consequence of its gravity, is made to actuate the rake and be the means of causing it to be raked off the platform at proper intervals so as to form gavels or sheaves of uniform size.

The invention consists, second, in a peculiar registering device connected with the raking device, and so arranged as to number the gavels or sheaves as they are raked from the platform.

This invention is designed chiefly for small hand-harvesters, or those which are shoved along by an operator; but it may be applied to large machines with advantage.

To enable those skilled in the art to fully understand and construct my invention, I will proceed to describe it.

A represents a platform, which is mounted on two wheels, B B', said wheels being about at the center of the platform, so that the platform will be about balanced thereon. The wheel B' is the driving-wheel, and it is toothed or cogged at its inner periphery.

C is a shaft, which is fitted or attached to the under side of the platform, and has a pinion, $a$, on it at one end, said pinion gearing into the wheel B'. The opposite end of the shaft C has a bevel-pinion, $b$, on it, which pinion is made to turn alternately through the medium of two loose pinions, $c\ c$, and a clutch, $d$, a shaft, D, which is also placed underneath the platform and has two pulleys, $e\ e$, on it—one at each end. The clutch $d$ is attached to a sliding bar, E, also placed underneath the platform.

On the platform A a frame, F, is placed. This frame may be formed of two parallel bars, $f\ f$, connected by a cross-tie, $g$, to the center of which tie a vertical bar, $h$, is attached, the bar $h$ passing through the platform and having its lower end beveled, as shown at $i$, Fig. 1.

To the bar $h$ one end of a lever, $j$, is attached and a weight or counterpoise, $k$, is placed on the opposite end of the lever, said lever being in fact a scale-beam, as shown clearly in Fig. 2. Each pulley E E has a cord or chain, $l$, passing around it. These cords or chains pass around pulleys $m\ m$ at each end of the platform, and to each cord or chain $l$ a small stock, $n$, is attached, said bar or stock working in grooves $o$, formed in bars $p\ p$, which are attached to the platform—one near the front and the other near the back end—said bars being parallel with each other.

To each stock $n$ a finger or arm, $q$, is attached by a pivot, and the lower end of the finger or arm $r$, which works at the back side of the front bar, $p$, has a small projecting hook, $s$, formed on it.

To the under side of the platform A a bent lever, G, is attached, the fulcrum-pin of which is shown at $t$. One end of this lever is connected with the sliding bar E, and the opposite end is connected with a bar, H, which extends the whole width of the platform, and has its ends bent upward, so as to project a trifle above the upper surface of the platform and just back of the front bar, $p$, as shown at $a^x$, Fig. 2.

On the shaft C a drunken wheel, $u$, is placed. This wheel works in the inner forked end of a lever, I, which has its fulcrum at $v$, and its front end fitted in a cutter, J, which is provided with the usual triangular teeth, $w$. The cutter-bar $a'$ of the cutter J rests on friction-rollers $b'$, which are placed in the front bar, $c'$, of the framing, to which the platform is attached. (See Fig. 1.) The cutter J works over a stationary cutter, K, which is permanently attached to the bar $c'$, and is provided with teeth $d'$, of the same form as the teeth $w$ of the cutter J. The teeth $d'$, however, are larger than the teeth $w$ of the cutter J, as shown clearly in Figs. 1 and 3.

In the front part of the platform A, and directly over the teeth $w$ of the cutter J, a series of vertical tubes, $e'$, are fitted, a tube, $e'$, being directly over each tooth $w$ of the cutter J.

On the back end of the platform A, and in a suitable guide or stock, $f'$, a sliding pawl, $g'$, is fitted. This pawl has a spiral spring, $h'$, around it, which has a tendency to keep the pawl thrust inward, so that its inner end will be in the path of the stock $n$, which works in the groove of the back bar, $p$. The outer end of the pawl $g'$ catches against a ratchet, $h'$, which has a screw, $i'$, upon it, said screw gearing into a pinion, $j'$, on a shaft, $k'$, the outer end of which has an index, $l'$, on it, said index traversing over a dial, $m'$, which is fitted in the back end of a guard-box, L, which covers the wheel B' and adjoining working parts.

M is a reel, the axis $o'$ of which is hung in an upright, $n'$, at one side of the machine. This reel is driven by a belt, $p'$, which passes around a pulley, $p^\times$, on the axis $o'$, and around a pulley, $q'$, on the axis of the wheel B'.

To the back end of the platform A handles N N are attached, as shown clearly in Figs. 1 and 3.

The operation is as follows: The machine is shoved along by the operator, who grasps the handles N N, or, rather, a cross-piece, N', attached thereto. As the machine moves along, the upper cutter, J, has a reciprocating motion given it by the lever I, which is actuated by the drunken wheel $u$ on the shaft C. The cutter J is kept perfectly lubricated by passing oil into the tubes $e'$, and the rollers $b'$, on which the cutter-bar $a'$ bears, diminish friction. The grain is cut between the teeth $w$ $d'$ of the cutters J K, and the cut grain falls upon the frame F, and when a sufficient quantity is upon the frame F to counterpose the weight the frame will of course fall or be depressed, and the lower beveled end of the bar $h$ will actuate the sliding bar E, which in turn will actuate the clutch $d$, so that the shaft D will be rotated in the proper direction through the medium of the shaft C and the proper clutch-wheel $c$, and the fingers or arms $q$ $q$ will be moved by means of the cords $l$ from right to left, and in so doing will rake the cut grain off from the frame F. When the fingers or arms $q$ $q$ reach the left side of the platform the lower end of the finger or arm $q$ nearest the front part of the platform will strike the end $a^\times$ of the bar H, and the bar H will be moved and the lever G thereby made to actuate the sliding bar E, and consequently the clutch $d$, said clutch reversing the shaft D, so that the fingers or arms $q$ will be moved back within the guard L and actuate the bar H by striking against its projection $a^\times$ within said guard L, so that the clutch $d$ will throw the shaft D out of gear with the shaft C. When the grain has been raked off the frame F, the weight $k$ will of course raise the frame F, which will again be depressed when a sufficient quantity of grain is placed on it to overcome the weight $k$ and the cut grain raked from it, as before. Each time the fingers or arms $q$ are moved back within the head L the stock $n$ of the finger $q$, at the back part of the platform, will actuate the pawl $g'$ sufficiently so that it will throw the ratchet $h'$ the distance of one tooth, and the screw $i'$ on the shaft of said ratchet will actuate the pinion $j'$, so that the shaft $k'$ and index $l'$ will be turned a certain distance. The index $l'$ therefore will point out on the dial $m'$ the number of gavels raked off the frame F.

I would remark that the sliding bar E may be operated independently at any time required by means of a cord, $x$, attached to it and the cross-piece N'.

Having thus described my invention, what I claim as new, and desire to secure by Letters Patent, is—

1. The balance-frame F or its equivalent, connected with fingers or arms $q$ or other raking device in such a manner that the cut grain by its own gravity, in connection with the weight or counterpoise $k$ of the frame F, will be made to actuate the raking device so that the gavels will be discharged from the frame of equal weight, however variable the crop being cut may be.

2. The peculiar arrangement of the balance-frame F, shaft D, with clutch $d$ attached, pulleys $e$ $e$ on shaft D, cords $l$, fingers or arms $q$ $q$, and bar H, substantially as and for the purpose set forth.

3. The registering device formed of the dial $m'$ and index $l'$, operated automatically from the raking device, substantially as and for the purpose herein set forth.

OREN STODDARD.

Witnesses:
ABRAM FRANK,
ISAAC BENEDICT.